United States Patent [19]
Jackson

[11] Patent Number: 5,562,375
[45] Date of Patent: Oct. 8, 1996

[54] PUSH TYPE FASTENER

[75] Inventor: Steven A. Jackson, Fountain Valley, Calif.

[73] Assignee: The United States of America as represented by the Administrator of the National Aeronautics and Space Administration, Washington, D.C.

[21] Appl. No.: 338,111

[22] Filed: Nov. 9, 1994

[51] Int. Cl.⁶ .................................................. F16B 13/06
[52] U.S. Cl. .................. 411/48; 411/60; 411/70
[58] Field of Search ................................ 411/41, 45, 46, 411/48, 60, 70

[56] References Cited

U.S. PATENT DOCUMENTS

| | | | |
|---|---|---|---|
| 3,918,130 | 11/1975 | Poe | 24/73 P |
| 4,276,806 | 7/1981 | Morel | 411/41 |
| 4,502,193 | 3/1985 | Harmon et al. | 24/621 |
| 4,674,930 | 6/1987 | Poe et al. | 411/40 |
| 4,784,550 | 11/1988 | Wollar | 411/32 |
| 4,786,225 | 11/1988 | Poe et al. | 411/32 |
| 4,821,381 | 4/1989 | Kaneko et al. | 24/297 |
| 5,085,545 | 2/1992 | Takahashi | 411/48 |
| 5,201,623 | 4/1993 | Benedetti et al. | 411/48 |
| 5,211,519 | 5/1993 | Saito | 411/45 |
| 5,370,484 | 12/1994 | Morikawa et al. | 411/48 |
| 5,375,954 | 12/1994 | Eguchi | 411/48 |

FOREIGN PATENT DOCUMENTS 248728  12/1963  Australia .............................. 411/46

Primary Examiner—Neill R. Wilson
Attorney, Agent, or Firm—Hardie R. Barr

[57] ABSTRACT

A push type fastener for fastening a movable structural part (41) to a fixed structural part (43), wherein the coupling and decoupling actions are both a push type operation, the fastener consisting of a plunger (12) having a shank (20) with a plunger head (18) at one end and a threaded end portion (26a) at the other end, an expandable grommet (14) adapted to receive the plunger shank (20) therethrough, and an attachable head (16) which is securable to the threaded end of the plunger shank (20). The fastener (10) requires each structural part (41, 43) to be provided with an aperture (45, 46) and the attachable head (16) to be smaller than the aperture (46) in the second structural part. The plunger (12) is extensible through the grommet (14) and is structurally configured with an external camming surface (25) which is cooperatively engageable with internal surfaces (38) of the grommet so that when the plunger is inserted in the grommet, the relative positioning of said cooperable camming surfaces determines the expansion of the grommet. Coupling of the parts is effected when the grommet is inserted in the aperture (46) in the fixed structural part (43) and expanded by pushing the plunger head (18) and plunger at least a minimal distance through the grommet. Decoupling is effected by pushing the attachable head (16).

5 Claims, 2 Drawing Sheets

PUSH TYPE FASTENER

ORIGIN OF THE INVENTION

The invention described herein was made in the performance of work under a NASA contract and is subject to the provisions of Section 305 of the National Aeronautics and Space Act of 1958, Public Law 85-568 (72 Stat.435; 42U.S.C. 2457).

FIELD OF THE INVENTION

This invention relates to fasteners and, more particularly, to a plunger type fastener for attaching a readily removable part to a fixed part where access may be available from both sides of the coupling.

BACKGROUND OF THE INVENTION

Push type fasteners wherein the fastener is inserted through aligned holes on parts to be fastened together and pushed at one end to cause an expansion of a fastener component and thereby secure the parts together are well known. However, for decoupling the secured parts, the fastener is released by pulling. Such "push to latch" and "pull to unlatch" fasteners are suitable for "blind applications" wherein access is available from one side only. However, their small head size makes them unusable when the head cannot be grasped to pull due to wearing of bulky gloves and limited dexterity. In many fastener applications size and weight are critical such that a large-head modification of the fastener would not be practical.

SUMMARY OF THE INVENTION

. The invention relates to a push type fastener wherein the coupling and decoupling actions are a push-type operation. The latch consists of a plunger component having a rounded end and a threaded end, an expandable grommet, and a rounded head which is securable to the threaded end of the plunger. The plunger is extensible through the grommet and is structurally configured with an external camming surface which is cooperatively engageable with an internal surface of the grommet so that when the plunger is inserted in the grommet, the relative positioning of said cooperatively engageable surfaces determines the expansion of the grommet.

For attaching a removable part to a fixed part by the fastener of this invention, it is necessary that the two said parts must be provided with holes through which the fastener can be inserted to effect their attachment. The rounded head, which is securable to one end of the plunger, is of a slightly smaller size than the hole through the fixed part so that it easily passes therethrough.

As a preliminary step in a fastening operation, the grommet is inserted into a hole provided in the removable part. A radial flange on the grommet prevents the grommet from passing completely through the hole in the removable part. The plunger is then inserted, threaded end first into the grommet to an extent such that the grommet remains in unexpanded condition. The rounded head, which is slightly smaller than the hole through the fixed part, is then attached to the threaded end of the plunger. The removable part is then aligned with the fixed part by alignment of the holes provided respectively therein, and the fastener with the grommet in non-expanded condition thereon, is then inserted rounded head first through the hole in the fixed part to where the grommet flange engages the removable part. To accomplish fastening of the two parts, simply pushing the plunger head causes the expansion of the grommet on the side of the fixed part opposite the radial flange thereby clamping and fastening the two parts together. The fastener is also provided with the unique feature that it can be decoupled without pulling on the plunger, since only a push on the rounded head is used to extract the plunger and thereby break the coupling. This makes the fastener ideal for low-dexterity situations while still retaining the small size and weight of the existing conventional "push to latch" and "pull to unlatch" fasteners.

DETAILED DESCRIPTION OF THE INVENTION

Figures 1, 2:
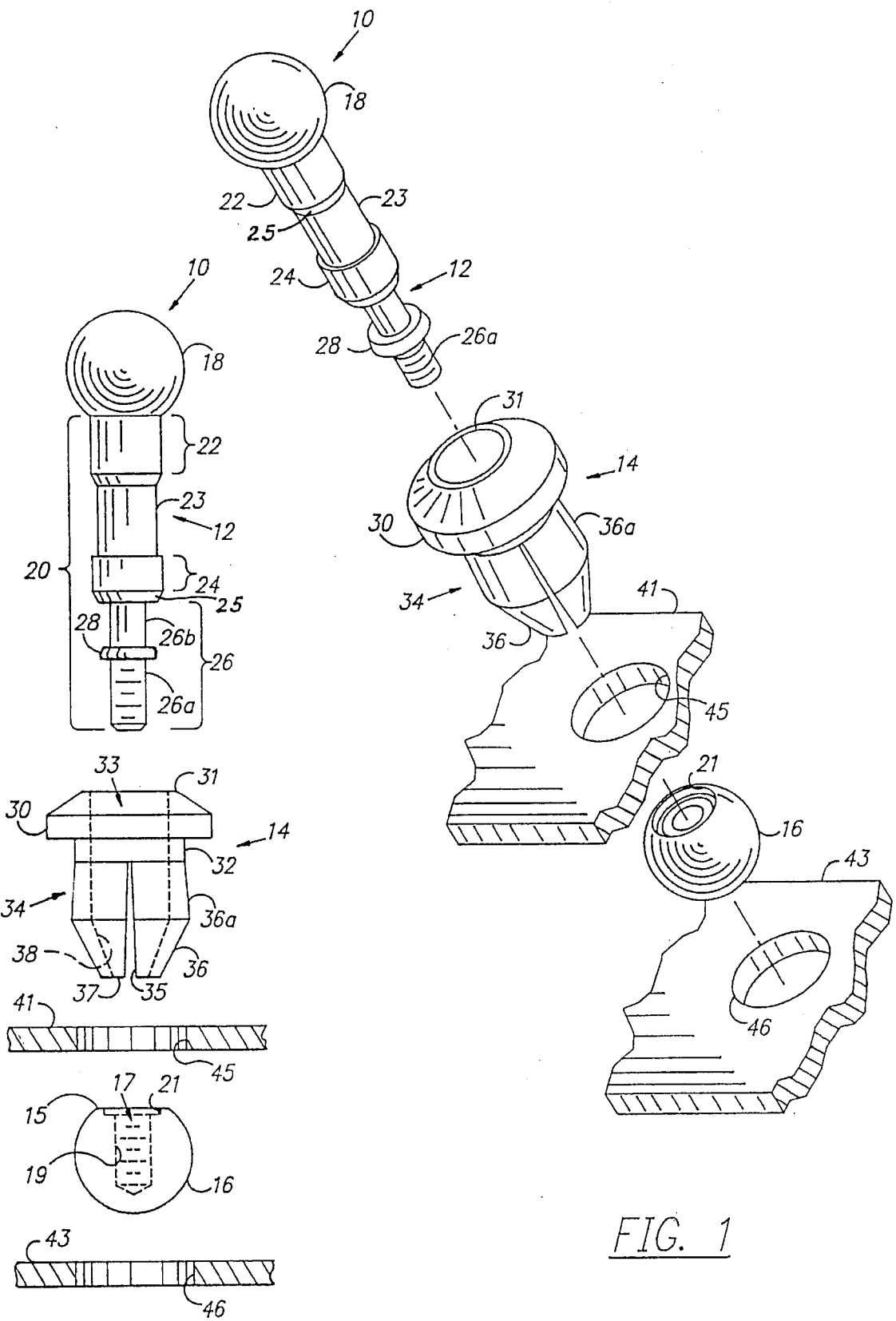
FIG. 1 is an exploded view in perspective of the fastener of the invention being shown in proximity to two structural parts to be coupled.
FIG. 2 is another exploded view of the fastener of the invention showing internal surfaces of the expandable grommet and attachable head of the fastener.
Figure 3:
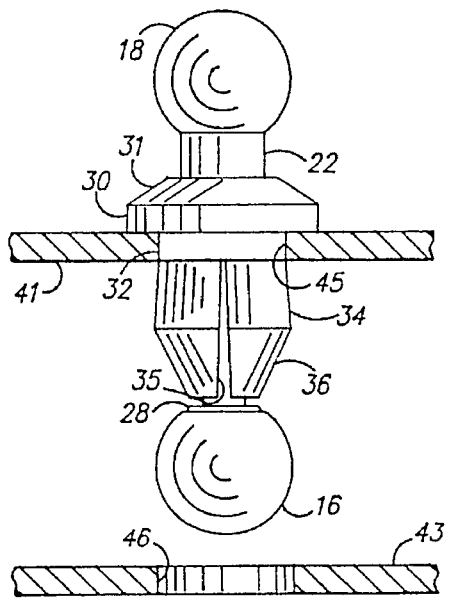
FIG. 3 is a view of the fastener of the invention showing the plunger component of the fastener inserted to a limited extent in the fastener grommet and the grommet installed in unexpanded condition in a hole in a first structural part which is aligned with a second structural part to which it is to be coupled.

Referring to FIG. 1, there is shown in exploded view, a fastener 10 which comprises a plunger 12, an expandable grommet 14 and a readily attachable rounded ball head 16. The plunger 12 is provided with a cylindrical shank portion 20 of circular radial cross section and a large rounded manipulating head 18 integrally attached thereto at one end. The shank portion 20 comprises a large diameter section 22 which connects to the manipulating head 18, an intermediate diameter section 23, a large diameter section 24 equal in diameter to the section 22, and a reduced diameter section 26. The reduced section 26 has a threaded end portion 26a, and a smooth surface portion 26b with an annular radial flange 28 located intermediate the threaded end of the plunger and the large diameter section 24. The flange 28 serves as a stop for the threads on the threaded end of the plunger.

The grommet 14 is provided with a large annular radial flange 30 at one end 31, a central cylindrical section 32 of circular cross section, an axial opening 33 extending therethrough, and two pair of flexible jaws or tabs 34, each jaw of which is integrally connected at one end to the cylindrical section 32. The jaws of each pair are in diametrically opposed relation to one another, and are formed by four slots 35 extending from the opposite end 37 of the grommet to its cylindrical section 32. When viewed in a transverse radial plane through the grommet, the slots are at locations in 90° angular relation. Each jaw 34 has an external tapered surface 36 which extends from the free end of the jaw in a divergingly outward direction to approximately the mid-length point of the jaw and in configuration is one-half of a frusto-conical surface. The remaining external surface 36a of the jaw extends from the cylindrical surface of section 32 as a frusto-conical extension thereof.

Figure 6:
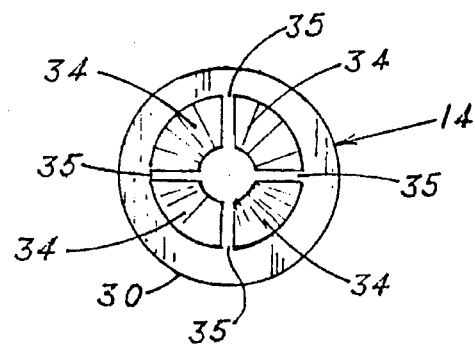
FIG. 6 is an end view of the expandable grommet of the fastener of the invention.

The axial opening 33 through the grommet flange 30 and its cylindrical section 32 is circular in radial transverse cross section and of a complementary size and shape sufficient to accommodate the enlarged diameter portions 24, 22 of the plunger in an easy sliding fit therein. As shown in FIG. 2, the inner surface of each jaw 34 comprises a cylindrical portion, which is quarter-circular in transverse cross section and extends from the grommet end 31 at the opening 33 through the grommet section 32 to an inner camming surface 38 which tapers and converges inwardly towards the end of the jaw 34. Each tapered surface 38 is approximately one-quarter of a frusto-conical surface which is divided by a pair of diametral planes through its longitudinal axis and in orthogonal relationship to one another as best seen in FIG. 6.

The material of which the grommet is made, whether it be metallic, plastic or the like, is sufficiently pliant such that the jaws are adapted to be cammed open and away from one another by forces applied to their internal camming surfaces 38, each of which forces includes a component in a radially outward direction of the longitudinal axis of the grommet.

The attachable rounded head 16 is of spherical shape truncated by an annular planar surface 15 which approximates an annular chamfered surface 25 which is provided on the end of the large diameter shank section 24 and which faces the plunger flange 28. This head 16 is provided with an inwardly extending blind bore 17 having an internally threaded section 19 and an enlarged diameter threaded-relief smooth bore section 21 connecting therewith which opens at the planar surface 15.

The fastener 10 of the invention is particularly intended for use in removably joining a perforated first structural member, such as a panel 41, to a perforated second structural panel, such as a fixed panel 43. To be joined by the fastener 10, both of the panels 41, 43 must be provided with a hole such as holes 45 and 46 through which the fastener can be inserted to effect their attachment and the holes must be sized appropriately. In particular, the hole 45 in the removable structural part 41 must be smaller in size than the radial flange 30 of the grommet, but sufficiently large to accommodate passage of the grommet jaws such that the grommet cannot pass completely therethrough. Also, the hole 46 in the fixed structural part 43 must be slightly larger than the attachable head 16 and also slightly larger than the largest transverse dimension of the cylindrical section 32 of the grommet and the grommet jaws 34 when in unexpanded condition.

Figure 4:
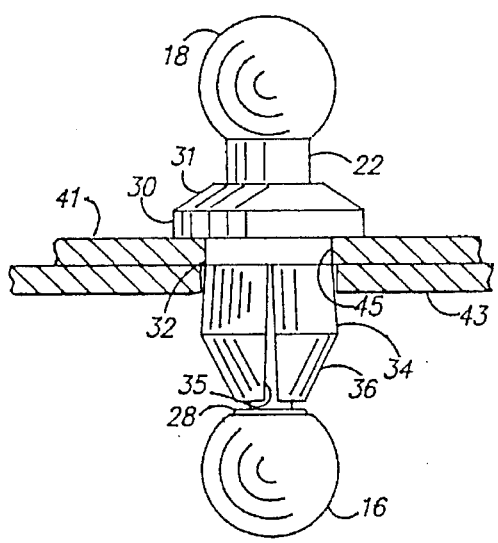
FIG. 4 is a view showing the fastener of FIG. 3 with unexpanded grommet installed in two structural parts to be coupled.

As a preliminary step in a fastening operation, the grommet 14 is inserted into the hole 45 in the removable part 41. The radial flange 30 on the grommet 14 prevents the grommet from passing completely through the hole 45 in the removable part. The plunger 12 is then inserted, threaded end first, into the grommet to an extent such that the grommet remains in unexpanded condition. The rounded head 16, which is slightly smaller than the hole 46 through the fixed part 43, is then attached to the threaded end of the plunger. The removable part 41 is then aligned with the fixed part 43 by alignment of the holes 45, 46 provided respectively therein, and the fastener 10 with the grommet in non-expanded condition thereon, is then inserted with rounded head 16 first through the hole 46 in the fixed part 43 to where the grommet jaws 34 engage the fixed part 43 as shown in FIG. 4.

Figure 5:
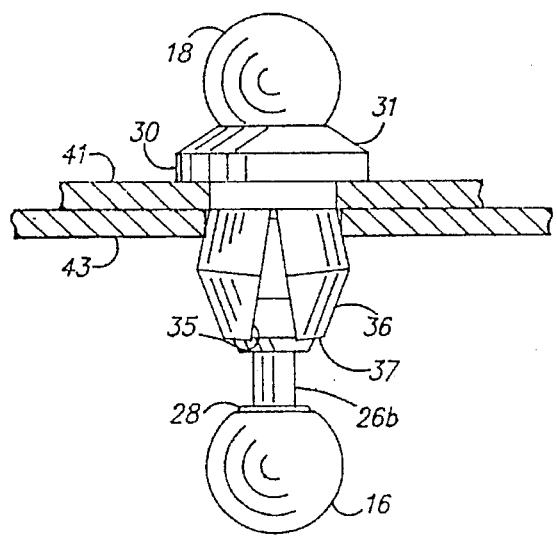
FIG. 5 is a view showing the fastener installed in fastened condition in two structural parts which are coupled thereby.

As a further step to accomplish fastening of the two parts 41, 43 requires pushing the plunger head 18 to cause axial movement of the plunger 12 in the grommet 14 to where the camming surface 25 on the plunger engages the four internal camming surfaces 38 of the grommet jaws 34 and applies a force thereto which drives the jaws apart and places the grommet in expanded condition, as shown in FIG. 5. It is to be noted that the application of force by the plunger camming surface 25 on the camming surfaces of the jaws includes a component directed radially outward from the plunger axis and thereby causes each jaw 34 to flex at its junction with the grommet cylindrical section 32. The resultant opening of the jaws 34 causes expansion of the grommet such that the outer surfaces 36a of the jaws engage the circular edge provided by the hole 46. The engagement of the jaws 34 against the fixed part 43 and the engagement of the grommet flange 30 against the removable part 41 thereby locks parts 41, 43 in a tightly secured fastened relationship.

It is also desirable to secure the plunger in the grommet against vibration by providing circumferential ridges (not shown) around the cylindrical portion of the shank camming section 24 and corresponding ridges on the internal camming surface 38 of the grommet jaws. The provision of such ridges is a standard feature in some commercial fasteners.

When decoupling of the structural parts 41, 43 is desired, the decoupling requires only a push be applied on the rounded head 16 of the fastener with a force component in the general axial direction of the plunger whereby the cooperative camming surfaces of the plunger and grommet are disengaged and the grommet returns to its unexpanded condition. Complete decoupling of the parts 41, 43 is accomplished by releasing all fasteners securing them and grasping the removable part and removing it. There is normally no need to remove the fastener from the part 41.

It is to be noted that the fastener of the invention which requires special care and skill at installing the ball end 16, is particularly useful where the person applying the fastener has low dexterity capability as when wearing gloves in cold or other hostile environments, or if the person is handicapped. It is also well suited for fastener applications in underwater operations and in extra-vehicular activities in manned space operations. Although a relatively snug fit of fastener parts is desirable but not always present, misalignment tolerance is provided by a slightly looser fit between plunger, grommet and the holes in the parts to be attached.

It is also to be understood that the foregoing description of a preferred embodiment of this invention has been presented for purposes of explanation and illustration and is not intended to limit the invention to the precise form disclosed. For example , the rounded heads could be other than spherical, and the grommet flange, could be much larger and of different shape than shown herein. The grommet might also be provided with one or several pairs of jaws rather than two. The rounded heads could also be attached to the plunger by means other than threads. If the parts are plastic, the plunger tip could terminate in a small spherical tip adapted to be snapped into a corresponding receptacle provided in the truncated rounded head. Accordingly, it is to be appreciated that many changes may be made in the structure and materials by those skilled in the art without departing from the spirit of the invention.

I claim:

1. A fastener for joining a removable structural part having a first aperture therein in fixed relation to a second structural part having a second aperture therein wherein said structural parts are adapted to be engaged with said apertures aligned with one another, said fastener comprising:

a plunger element including an elongate shank having a threaded end portion at one end and an enlarged manipulating plunger head at the other end, said shank having an enlarged diameter portion intermediate its ends with an annular chamfered camming surface on said enlarged diameter portion which faces toward said threaded end portion;

an expansible grommet having an opening therethrough of a size adapted to receive said shank therein but insufficient to receive the manipulating plunger head therethrough;

an enlarged attachable head having an internally threaded bore for receiving the threaded end portion of the plunger shank in threaded connection therewith, said attachable head being of a size so as to be freely passable through said aperture in said second structural part, said grommet having an external radial flange of a size larger than said first aperture so as to be impassable therethrough, said grommet having at least one pair of movable jaws which form a split body portion of said grommet and each said jaw having an internal bevelled camming surface, said jaw camming surfaces and said shank camming surface being constructed and arranged for cooperative camming engagement when said plunger shank is inserted in the grommet beyond a predetermined distance, whereby when said grommet is inserted through the aperture in said removable structural part and the plunger shank then inserted into said grommet, the attachable head may be secured on the threaded end of said shank with said grommet inserted through both of the aligned apertures with said grommet flange engaging the surface of the removable part about said first aperture, the plunger may be pushed in axial movement through the grommet towards said second structural part to cause the grommet jaws to open outwardly and expand the grommet to fasten said structural parts, said fastener being releasable by pushing on said attachable head to move said shank in axial movement towards said movable part.

2. A fastener for joining a removable structural part having a first aperture therein to a second structural part having a second aperture and wherein said structural parts are adapted to be placed in engagement with said apertures aligned with one another, said fastener comprising:

a plunger element including an elongate shank having a threaded end portion at one end, an enlarged plunger head at the other end and an enlarged diameter portion intermediate its ends with an annular camming surface thereon which faces toward the other end of said shank;

an expansible grommet having an opening therethrough of a size adapted to receive said shank therein but insufficient to receive the plunger head therethrough;

an enlarged attachable head having an internally threaded bore for receiving the threaded end portion of the plunger shank in threaded connection therewith, said attachable head being of a size so as to be freely passable through said aperture in said second structural part, said grommet having an enlarged diameter portion of a size larger than said first aperture and a reduced diameter portion smaller than said first aperture, said reduced diameter portion including at least one pair of movable jaws and each said jaw having an internal bevelled camming surface, said jaw camming surfaces being constructed and arranged for cooperative camming engagement with said shank camming surface when said plunger shank is inserted in the grommet beyond a predetermined distance, whereby when said grommet is inserted through the aperture in said removable structural part and said plunger shank is inserted into said grommet, the attachable head may be attached to the threaded end of said shank and said plunger may be pushed in axial movement through the grommet towards said second structural part to cause the grommet jaws to open outwardly and expand the grommet to thereby couple said structural parts, said fastener being releasable by applying a force on said enlarged attachable head to move said shank in axial movement towards said removable part.

3. A fastener for joining a removable structural part having a first aperture therein to a second structural part having a second aperture and wherein said structural parts are adapted to be placed in engagement with said apertures aligned with one another, said fastener comprising:

a plunger element including an elongate shank having a threaded end portion at one end, an enlarged plunger head at its other end and an enlarged diameter portion intermediate its ends with an annular camming surface thereon which faces toward the other end of said shank;

an expansible grommet having a longitudinal axial opening extending therethrough of a size adapted to receive said shank therein but insufficient to receive the plunger head therethrough;

an enlarged rounded head attachable to said other end of said plunger shank, said attachable head being of a size larger than said opening in the grommet but smaller than second aperture in said second structural port so as to be freely passable through said aperture in said second structural part;

cooperable means on said enlarged rounded head and said shank for attaching said enlarged rounded head to said other end of the shank, said grommet having an enlarged diameter portion of a size larger than said first aperture and a reduced diameter portion smaller than said first aperture, said reduced diameter portion including at least one pair of movable jaws and each said jaw having an internal bevelled camming surface, said jaw camming surfaces being constructed and arranged for cooperative camming engagement with said shank camming surface when said plunger shank is inserted in the grommet beyond a predetermined distance, whereby when said grommet is inserted through the aperture in said removable structural part and said plunger shank is inserted into said grommet, the attachable rounded head may be attached to said other end of said shank and said plunger may be pushed in axial movement through the grommet towards said second structural part to cause the grommet jaws to open outwardly and expand the grommet to thereby couple said structural parts, said fastener being releasable by applying a force on said enlarged attachable head to move said shank in axial movement towards said removable part.

4. A fastener for joining a removable structural part to a second structural part as set forth in claim 3 wherein said grommet is provided with two pairs of movable jaws which form a split body portion of said grommet, each jaw of a pair being in diametrically opposed relation to the other jaw of said pair.

5. A fastener for joining a removable structural part to a second structural part as set forth in claim 4 wherein each said jaw as oriented in a transverse radial plane through said split body portion is located in 90° angular relation to the next adjacent jaws.

* * * * *